(No Model.)
A. AYER.
ORANGE GRADER.
No. 435,200. Patented Aug. 26, 1890.
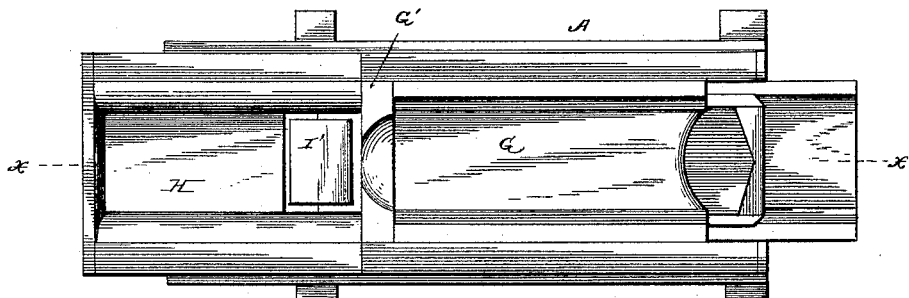
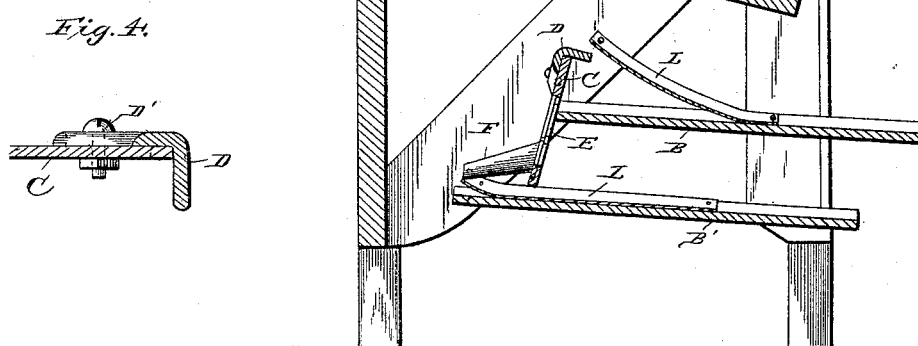
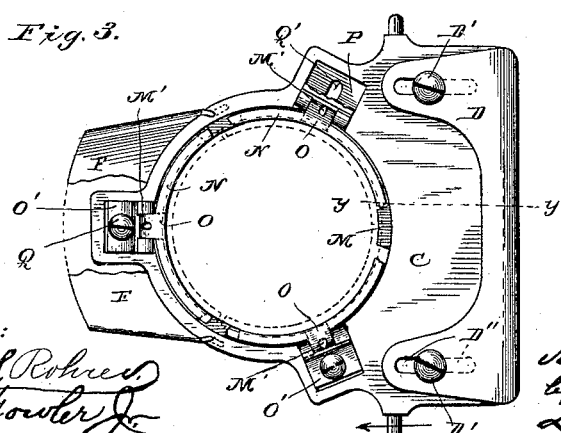
Witnesses:
Harry S. Rohrer
J. M. Fowler Jr.
Inventor:
Alfred Ayer
by
Attorneys.
THE NORRIS PETERS CO., PHOTO-LITHO., WASHINGTON, D. C.

UNITED STATES PATENT OFFICE.

ALFRED AYER, OF LAKE WEIR, FLORIDA.

ORANGE-GRADER.

SPECIFICATION forming part of Letters Patent No. 435,200, dated August 26, 1890.

Application filed May 23, 1890. Serial No. 352,852. (No model.)

*To all whom it may concern:*

Be it known that I, ALFRED AYER, a citizen of the United States, residing at Lake Weir, in the county of Marion and State of Florida, have invented certain new and useful Improvements in Orange-Graders; and I do hereby declare the following to be a full, clear, and exact description of the invention, such as will enable others skilled in the art to which it appertains to make and use the same.

An important object in grading oranges is to secure the exact filling of standard boxes with oranges of either size delivered by the machine. This end is not reached by the use of machines that grade by weight or that pass the fruit through long slots, for weight and size do not vary together, and a large orange, like a large coin, will often pass through a narrow slot, and for analogous reasons; but when the fruit is graded by passing through openings either circular or approximating this form, the desired result is secured with the greatest certainty, and the box is full, and yet no pressure is exerted by the cover. Graders of this latter class are usually beyond the means of small growers, who, in fact, produce most of the oranges in the market. Again, in all graders that size the fruit by passing it through openings there is a tendency of the fruit to wedge in the openings, and when this occurs the machine discharges unassorted fruit with that already graded, causing great annoyance.

To secure all the advantages and to obviate all the disadvantages above suggested is the object of this invention.

In the accompanying drawings, Figure 1 is a plan of the grader. Fig. 2 is a section on the line $x\ x$, Fig. 1. Fig. 3 is an enlarged view of the grading-plate and its attachments. Fig. 4 is a section on the line $y\ y$, Fig. 3.

In the drawings, A A is a suitably-supported frame, consisting, essentially, of two connected parallel vertical walls or members distant from each other a little more than the diameter of the largest orange. Between these walls are fixed any desired number of approximately parallel slightly-inclined spouts B B', each extending forward beyond the one above it. Pivoted in the walls almost vertically over each of these ends is a grading-plate C, having in the rear of its pivotal axis an adjustable counter-weight D, and in front of that axis an opening E. In front of the opening is a guide-spout F, fixed to the edge of the plate and making an obtuse angle with it.

Fixed at the top of the frame is a shallow rearwardly-inclined trough G, open at its lower end and preferably incurved, as shown, while its upper end is crossed by a bar G'. In front of this upper end is a narrow hopper H, whose lower end is nearly on a level with the upper end of the trough and whose upper end is materially higher. Beneath both is a lever I, pivoted at some distance in front of its middle and having at its forked rear end a downwardly and forwardly inclined spout J, which projects above the plane of the trough and terminates below a little above the first plate C. The opposite or front end of the lever is bent upward at I', and lies in an opening H' in the bottom of the hopper H in position to support an orange resting in the hopper and against the bar G'. The spout J is practically a part of the lever and may be made integral with it.

Oranges may be placed in the hopper in any convenient manner; but this invention does not extend to devices therefor, and none are shown. Let us suppose the hopper to contain a line of oranges, the foremost resting upon the end I' of the lever and the supply continuous. If now an orange be placed in the trough, the machine is set in operation and goes on indefinitely without attention, delivering oranges in as many grades as may have been determined when the machine was made— three grades—as the apparatus is shown in the drawings. The orange placed in the trough rolls down against the projecting end of the spout, between which and the trough it cannot pass when the spout is in its normal position; but as the spout is inclined it receives most of the weight of the orange, and is thereby swung downward about its pivot K, leaving space for the orange to pass beneath the end of the trough, which it does, rolling down the steep incline and falling upon the plate C directly over the opening therein. If small enough to pass through, it drops upon an inclined canvas apron L and rolls out along the spout B, whence it is diverted to any convenient receptacle in the usual manner. If too large to pass through this opening, its weight, resting upon the plate, causes the latter to rotate upon its pivot to the position illustrated in Fig. 2 near the bottom of the machine, and the orange rolling down the then inclined guide-spout F drops upon the next plate C, just over the opening therein, which is larger than the one above. If it can pass through, it does so, and falls upon a second apron like the first and rolls out along the spout B'. If it cannot pass, it swings the guide-spout as before, and passing to the front of the fixed spout B' drops to the floor or into any receptacle or conveyer placed to receive it. When an orange is discharged by the inclined plate, or either of them, the plate is instantly returned to position by the action of the adjustable counter-weight D upon the opposite side of the pivotal axis. As the lever I swings downward under the weight of the orange received from the trough G, its opposite end of course rises, and this lifts the first orange in the hopper, so that it can roll over the bar G' into the trough, while the orange that has just left the trough is descending the inclined spout at the opposite end of the lever. The next instant the lever, relieved of the weight of the first orange and impelled by an adjustable counter-weight I'', returns to position and the next orange in the hopper rolls down and replaces the one just raised. The orange now in the trough acts precisely as did the one first placed therein by hand, and the whole operation is repeated automatically and without cessation. It is essential that the rear lever-arm be the longer, as shown, in order that a small orange thereon may lift a larger one from the hopper, and that the shorter arm be the heavier, so that it may fall when the orange passes off the opposite end. As oranges are not at all times and in all places of the same average size and weight, and for other reasons, it is desirable to have the openings in the grading-plates adjustable in size, and for analogous reasons the counter-weights on the plates must vary in force. There must also be means to prevent the fruit from wedging in the openings. The opening in the plate is made larger than any orange, and from points on its lower margin lugs M project inward. On these rest the ends of annular segments N, lying within the opening and provided with hinge-leaves O upon their outer sides. These are pivotally connected with leaves O', which rest in depressions P in the plate, and are adjustably retained by screws Q, passing through slots Q' in the bottom of the recess. The lugs M prevent the segments from swinging through the openings, and lugs M' limit the motion in the opposite direction, although within those limits the segments swing freely. It is to be observed that any one of these openings may be varied without changing any other. The spouts B B' are so placed that the front end of each lies diametrically across the path of the opening in the plate next above it, and hence when the plate rotates the rounded side of an orange wedged in it and necessarily projecting below the plane of the plate strikes the end of the spout and the orange is forced out. The hinging of the segments makes this result certain, for as the segments swing they separate. The counter-weights D are plates L-shaped in cross-section, overlapping the plates C and retained in position by screws D', that are adjustable in slots D'' in the plate. The downwardly-projecting limb of each counter-weight normally rests upon the spout B next below, and fixes the angle of the plate when at rest.

What I claim as new, and desire to secure by Letters Patent, is—

1. In an orange-grader, a pivoted plate having on one side of its pivotal axis a grading-opening and upon the opposite side a counter-weight to keep the plate in position unless overbalanced by the weight of an orange that cannot pass through the opening.

2. In an orange-grader, a grading-ring made up of segments hinged to swing out of the normal plane of the ring, substantially as set forth.

3. The combination, with the inclined trough open at one end, of the inclined hopper at the opposite end and the pivoted bent lever having one end projecting above the open end of the trough and the other lying in an opening in the bottom of the hopper, substantially as and for the purpose set forth.

4. In an orange-grader, a pivoted plate having a grading-aperture upon one side of its pivotal axis and upon the opposite side an adjustable counter-weight, said aperture being adjustable in size.

5. The combination, with the inclined hopper, of a pivoted lever having its shorter and heavier arm projecting into the hopper at the bottom thereof in position to receive the foremost orange upon the inclined bottom of the hopper and a trough adapted to receive the orange from said arm when this arm is raised and to deliver it upon the longer and lighter lever-arm, whereby the weight of each orange, whether small or large, resting upon the longer arm may lift from the hopper another to take its place.

6. The combination, with a pivoted plate having a grading-opening at one side of its pivotal axis, of a stop fixed in position to push from the opening an orange wedged therein when the weight of the orange rotates the plate.

7. The combination, with a pivoted plate having a grading-opening at one side of its pivotal axis, of a discharge-spout fixed beneath said opening and a second spout fixed to the plate to carry the orange beyond the end of the spout first named when the plate is rotated by an orange that cannot pass through the opening.

8. The combination, with a suitable frame and a series of spouts fixed therein one above the other and each projecting longitudinally beyond the one above, of grading-plates pivoted in the frame with their grading-openings respectively immediately over said spouts and guide-spouts fixed, respectively, to said plates to guide the oranges to the next lower plate when the weight of an orange produces rotation.

In testimony whereof I affix my signature in presence of two witnesses.

ALFRED AYER.

Witnesses:
G. A. MARTON,
H. P. EAGLETON.